US009569174B2

(12) United States Patent
Rogers et al.

(10) Patent No.: US 9,569,174 B2
(45) Date of Patent: Feb. 14, 2017

(54) METHODS AND SYSTEMS FOR MANAGING SPEECH RECOGNITION IN A MULTI-SPEECH SYSTEM ENVIRONMENT

(71) Applicant: HONEYWELL INTERNATIONAL INC., Morristown, NJ (US)

(72) Inventors: William Rogers, Minneapolis, MN (US); Emmanuel Letsu-Dake, Shakopee, MN (US); Stephen Whitlow, St. Louis Park, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 223 days.

(21) Appl. No.: 14/325,916

(22) Filed: Jul. 8, 2014

(65) Prior Publication Data

US 2016/0011853 A1   Jan. 14, 2016

(51) Int. Cl.
G10L 15/00 (2013.01)
G10L 21/00 (2013.01)
G10L 25/00 (2013.01)
G06F 3/16 (2006.01)
G06F 3/01 (2006.01)
G10L 15/22 (2006.01)
G10L 15/24 (2013.01)

(52) U.S. Cl.
CPC ............ *G06F 3/167* (2013.01); *G06F 3/01* (2013.01); *G06F 3/013* (2013.01); *G06F 3/017* (2013.01); *G10L 15/22* (2013.01); *G10L 15/24* (2013.01); *G10L 2015/223* (2013.01); *G10L 2015/227* (2013.01)

(58) Field of Classification Search
USPC ............... 704/235, 246, 270, 270.1, 275
See application file for complete search history.

(56) References Cited

U.S. PATENT DOCUMENTS

| 5,668,573 | A | 9/1997 | Favot et al. |
| 6,154,723 | A | 11/2000 | Cox et al. |
| 6,157,403 | A * | 12/2000 | Nagata ............... G01S 15/46 348/171 |
| 6,868,383 | B1 * | 3/2005 | Bangalore ......... G06K 9/00355 704/251 |
| 7,295,975 | B1 * | 11/2007 | Bangalore ......... G06K 9/00355 382/187 |

(Continued)

FOREIGN PATENT DOCUMENTS

EP    0 702 355 A2 *  9/1995  ............ G10L 9/20

OTHER PUBLICATIONS

McMillian, Y., Distributed Listening in Automatic Speech Recognition; Auburn, Alabama, Aug. 9, 2010.

(Continued)

*Primary Examiner* — Edgar Guerra-Erazo
(74) *Attorney, Agent, or Firm* — Lorenz & Kopf, LLP

(57) ABSTRACT

Methods and system are provided for managing speech processing in an environment having at least two speech enabled systems. In one embodiment, a method includes: recording first user data that indicates an action of a user; determining, by a processor, a selection of a first speech enabled system based on the recorded user data; and generating, by the processor, a signal to at least one of activate and deactivate speech processing based on the first speech enabled system.

20 Claims, 3 Drawing Sheets

(56) References Cited

U.S. PATENT DOCUMENTS

| | | | | |
|---|---|---|---|---|
| 7,774,202 B2* | 8/2010 | Spengler | | G10L 15/20 |
| | | | | 704/236 |
| 8,515,763 B2* | 8/2013 | Dong | | G10L 15/22 |
| | | | | 701/14 |
| 8,538,402 B2* | 9/2013 | Vidal | | H04W 4/00 |
| | | | | 455/418 |
| 8,914,014 B2* | 12/2014 | Vidal | | H04W 8/22 |
| | | | | 455/418 |
| 2002/0105575 A1 | 8/2002 | Hinde et al. | | |
| 2005/0175218 A1* | 8/2005 | Vertegaal | | A61B 3/113 |
| | | | | 382/103 |
| 2006/0110008 A1* | 5/2006 | Vertegaal | | G06K 9/00604 |
| | | | | 382/103 |
| 2007/0016426 A1* | 1/2007 | Hershey | | G10L 15/26 |
| | | | | 704/277 |
| 2007/0081090 A1* | 4/2007 | Singh | | G11B 27/034 |
| | | | | 348/333.11 |
| 2007/0288242 A1* | 12/2007 | Spengler | | G10L 15/20 |
| | | | | 704/275 |
| 2011/0125503 A1* | 5/2011 | Dong | | G10L 15/22 |
| | | | | 704/275 |
| 2013/0127980 A1 | 5/2013 | Haddick et al. | | |
| 2013/0210406 A1* | 8/2013 | Vidal | | H04W 4/00 |
| | | | | 455/418 |
| 2013/0281079 A1* | 10/2013 | Vidal | | H04W 8/22 |
| | | | | 455/418 |
| 2013/0304479 A1 | 11/2013 | Teller et al. | | |

OTHER PUBLICATIONS

Brutti, A., Use of Multiple Speech Recognition Units in an In-Car Assistance System; Partially funded by the Commission of the EC, Information Society Technologies (IST), 2000-25426, under VICO.
Extended EP Search Report for Application No. 15171540.6-1901/2966644 dated Jan. 16, 2014.

* cited by examiner

METHODS AND SYSTEMS FOR MANAGING SPEECH RECOGNITION IN A MULTI-SPEECH SYSTEM ENVIRONMENT

TECHNICAL FIELD

The present disclosure generally relates to methods and systems for managing speech recognition, and more particularly relates to methods and systems for managing speech recognition in an environment having multiple speech systems.

BACKGROUND

Speech recognition may be used for interaction with multiple systems in an aircraft. In some cases, the speech recognition capability of each system may be distinct. Interacting with multiple distinct speech systems when operating an aircraft can be difficult for a flight crew member to designate and keep track of which system they are interacting with.

In addition, the independent speech systems could have separate but overlapping vocabularies, which could result in unintended inputs or control actions if the flight crew believes they are commanding one system through speech, but in fact, are commanding another. If each system were developed such that there is little overlap in vocabularies, a risk of reduced recognition rates or non-responsive systems may result which may be frustrating or confusing to the crew members. These and other problems may exist for other environments having multiple independent speech systems.

Hence, there is a need for systems and methods for managing speech inputs in a multi-speech system environment. Other desirable features and characteristics will become apparent from the subsequent detailed description and the appended claims, taken in conjunction with the accompanying drawings and the foregoing technical field and background.

BRIEF SUMMARY

Methods and system are provided for managing speech processing in an environment having at least two speech enabled systems. In one embodiment, a method includes: recording first user data that indicates an action of a user; determining, by a processor, a selection of a first speech enabled system based on the recorded user data; and generating, by the processor, a signal to at least one of activate and deactivate speech processing based on the first speech enabled system.

In another embodiment, a system includes: an input device that records first user data that indicates an action of a user; and a processor. The processor determines a selection of a speech enabled system based on the recorded user data, and generates a signal to at least one of activate and deactivate speech processing based on the speech enabled system.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In accordance with various embodiments, speech management systems are disclosed for managing speech input from a user in an environment having multiple speech enabled systems. The speech management system generally allows for the selection of a particular speech enabled system through one or more input modalities (e.g., speech, gesture, gaze, etc.). For example, a user may simply say, point to, or look at the speech enabled system that he or she wants to control through speech, and the speech management recognizes the intent of the user and activates speech recognition for that system. Since the suggested input modalities do not require the user to touch the intended system or physically activate the system, the user is free to perform other tasks. In addition, the input modalities allow a user to interact with speech enabled systems that may be outside his or her reach-envelope. Based upon the selection, the speech management system generates signals to the selected speech enabled system and/or the non-selected speech enabled systems. The signals activate the speech recognition by the selected speech enabled system and/or deactivate speech recognition by the non-selected speech enabled systems.

Figure 1:
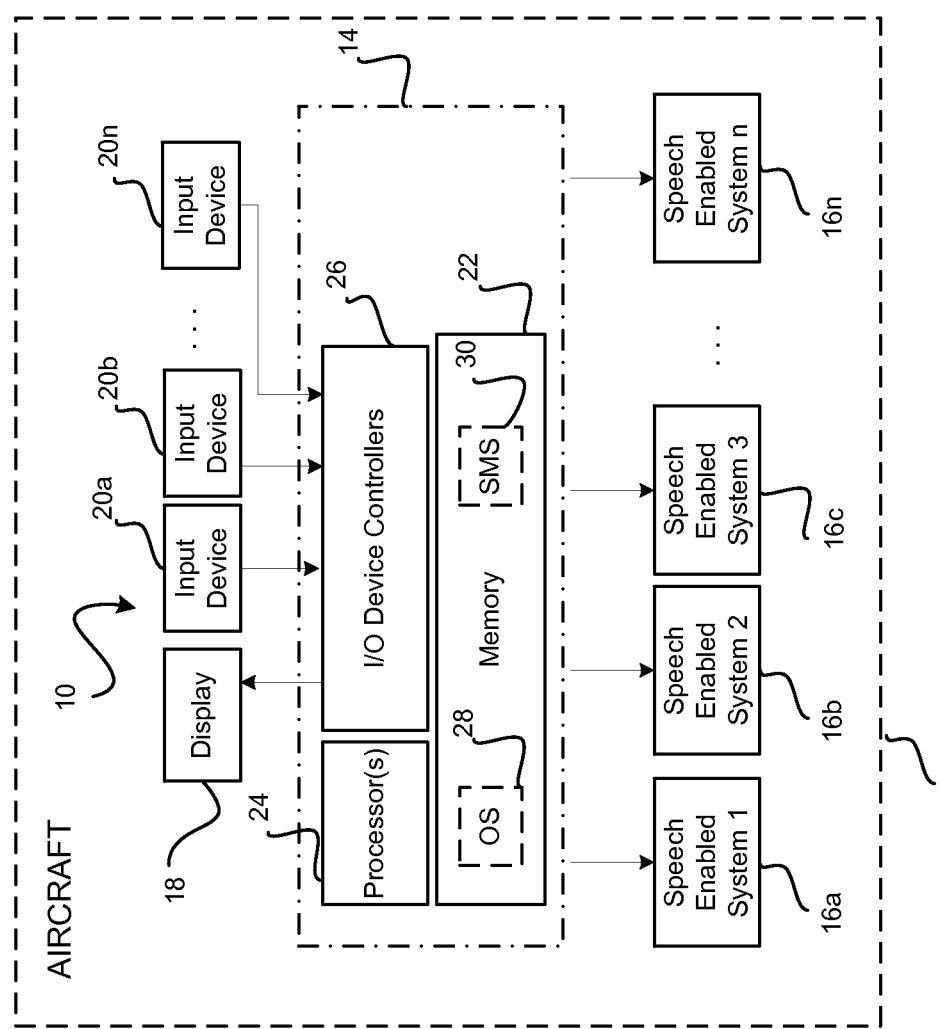
FIG. 1 is a functional block diagram illustrating a speech management system for an aircraft in accordance with exemplary embodiments.

Referring now to FIG. 1, exemplary embodiments of the present disclosure are directed to a speech management system shown generally at 10 that is associated with an aircraft 12. As can be appreciated, the speech management system 10 described herein can be implemented in any aircraft 12 (vehicle or other environment) having onboard a computing device 14 that is associated with two or more speech enabled systems 16a-16n.

In various embodiments, the speech enabled systems 16a-16n each include a speech system that is configured to receive and process speech input from a crew member or other user. In various other embodiments, the speech enabled systems 16a-16n receive inputs from a central speech processor (not shown) that performs speech processing for each of the speech enabled systems. As can be appreciated, the computing device 14 may be implemented as a part of one of the speech enabled systems 16a and may communicate with the other speech enabled systems 16b-16n, may be a stand-alone system that communicates with each of the speech enabled systems 16a-16n (as shown), or may be partially part of one or more of the speech enabled systems 16a-16n, and partially part of a stand-alone system.

The computing device 14 may be associated with a display device 18 and one or more input devices 20a-20n and may generally include a memory 22, one or more processors 24, and one or more input/output controllers 26 that are communicatively coupled to the display device 18 and the one or more input devices 20a-20n. The input devices 20a-20n include for example, an activation switch 20a, an audio recording device 20b, and/or one or more video recording devices 20n.

In various embodiments, the memory 22 stores instructions that can be performed by the processor 24. The instructions stored in memory 22 may include one or more separate programs, each of which comprises an ordered listing of executable instructions for implementing logical functions. In the example of FIG. 1, the instructions stored in the memory include an operating system (OS) 28 and a speech management system 30.

The operating system 28 controls the performance of other computer programs and provides scheduling, input-output control, file and data management, memory management, and communication control and related services. When the computing device 14 is in operation, the processor 24 is configured to execute the instructions stored within the memory 22, to communicate data to and from the memory 22, and to generally control operations of the computing device 14 pursuant to the instructions. The processor 24 can be any custom made or commercially available processor, a central processing unit (CPU), an auxiliary processor among several processors associated with the computing device 14, a semiconductor based microprocessor (in the form of a microchip or chip set), a macroprocessor, or generally any device for executing instructions.

The processor 24 executes the instructions of the speech management system 30 of the present disclosure. The speech management system 30 generally allows for the selection of a particular speech enabled system 16a-16n by a user through one or more input modalities (e.g., speech, gesture, gaze, etc.). The speech management system 30 recognizes the selection and activates the corresponding speech enabled system 16a-16n based on the selection.

In various embodiments, the speech management system 30 continuously monitors data of one or more of the input modalities for the user initiated selection, and/or the speech management system 30 monitors data of one or more of the input modalities only after being activated via the activation switch 20a or other input device. For example, in the case of using speech for the identification of the selection, the speech management system 30 receives an activation signal from the activation switch 16a and, in response, activates the audio recording device 20b for recording a command spoken by a user. The command may include a first name or other name designating a selected speech enabled system 16a-16n. The speech management system 30 processes the recorded audio data to determine the selected speech enabled system 16a. Once the speech enabled system 16a has been selected, the speech management system 30 activates speech recognition for the selected speech enabled system 16a by sending an activation signal to the speech enabled system 16a (e.g., when each speech enabled system 16a-16n performs speech processing) or by selecting a vocabulary and/or speech processing methods associated with the speech enabled system 16a (e.g., when a centralized speech processor performs the speech processing for all the speech enabled systems 16a-16n). Additionally or alternatively, the speech management system 30 deactivates speech recognition for the non-selected speech enabled systems by sending deactivation signals to the speech enabled systems 16b-16n.

In another example, in the case of using gesture for the identification of the selection, the speech management system 30 receives an activation signal from the activation switch 16a and, in response, activates the video recording device 20n (or other device) for recording a gesture performed by a user. The gesture may include any gesture made by a finger, hand, or arm, such as pointing for a minimum amount of time, or using a finger movement (e.g., a twirl) to indicate a direction of a selected speech enabled system 16a. The speech management system 30 processes the recorded video data to determine the selected speech enabled system 16a. Once the speech enabled system 16a has been selected, the speech management system 30 activates speech recognition for the speech enabled system 16a by sending an activation signal to the speech enabled system 16a (e.g., when each speech enabled system 16a-16n performs speech processing) or by selecting a vocabulary and/or speech processing methods associated with the speech enabled system 16a (e.g., when a centralized speech processor performs the speech processing for all speech enabled systems 16a-16n). Additionally or alternatively, the speech management system 30 deactivates speech recognition for the non-selected speech enabled systems by sending deactivation signals to the speech enabled systems 16b-16n.

In still another example, in the case of using gaze for the identification of the selection, the speech management system 30 receives an activation signal from the activation switch and, in response, activates the video recording device 20n (or other device) for recording a gaze of the user. The gaze of the user's eyes may indicate a direction of a selected speech enabled system 16a. The speech management system 30 processes the recorded video data to determine the selected speech enabled system 16a. Once a speech enabled system 16a has been selected, the speech management system 30 activates speech recognition for the speech enabled system 16a by sending an activation signal to the speech enabled system 16a (e.g., when each speech enabled system 16a-16n performs speech processing) or by selecting a vocabulary and/or speech processing methods associated with the speech enabled system 16a (e.g., when a centralized speech processor performs the speech processing for all speech enabled systems 16a-16n). Additionally or alternatively, the speech management system 30 deactivates speech recognition for the non-selected speech enabled systems by sending deactivation signals to the speech enabled systems 16b-16n.

Figure 2:
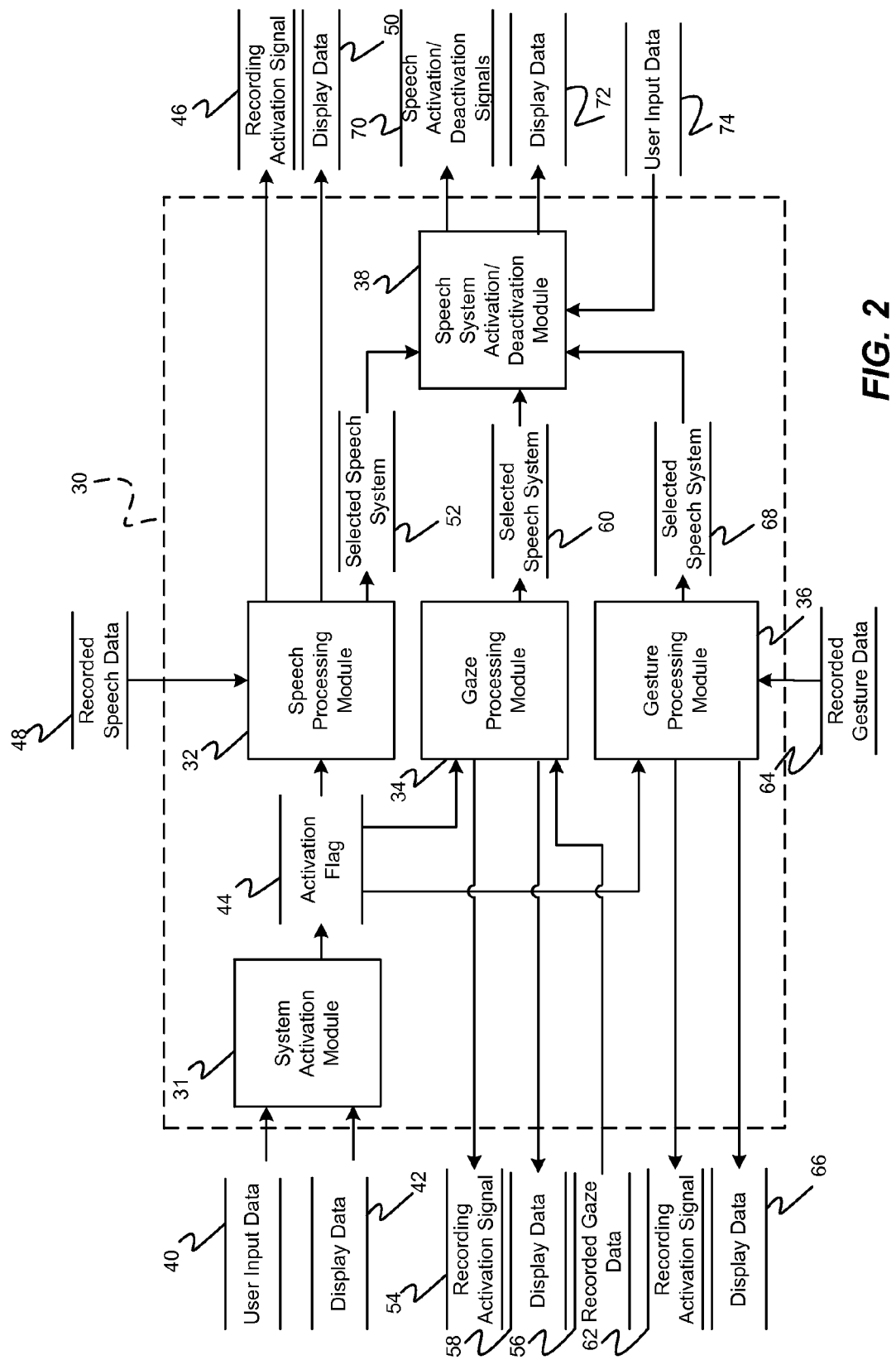
FIG. 2 is dataflow diagram illustrating modules of the speech management system in accordance with exemplary embodiments.

Referring now to FIG. 2 and with continued reference to FIG. 1, a dataflow diagram illustrates various embodiments of the speech management system 30. Various embodiments of speech management systems 30 according to the present disclosure may include any number of sub-modules embedded within the speech management system 30. As can be appreciated, the sub-modules shown in FIG. 2 may be combined and/or further partitioned to manage speech input to the speech management system 30. The inputs to the speech management system 30 may be received from other modules (not shown), determined/modeled by other sub-modules (not shown) within the speech management system 30, and/or may be user input that is based on a user interacting with a user interface via an input device 16a-16n. In various embodiments, the speech management system 30 includes a system activation module 31, at least one of a speech processing module 32, a gaze processing module 34, and a gesture processing module 36 (or any other processing modules depending on the number of input modalities), and a speech system activation/deactivation module 38.

The system activation module 31 receives as input user input data 40. The user input data 40 may be received based on a user interacting with an input device, such as, for example, the activation switch 20*a* or other device. The system activation module 31 processes the user input data 40 to determine if the user input data indicates a user's request to activate the selection of a speech enabled system 16*a*-16*n*. If the user input data 40 does not indicate to activate speech system selection, optionally, the system activation module 31 may generate display data 42 that includes a message that may be displayed in an interface that indicates that the input is not recognized. If the user input data 40 indicates to activate the speech system selection, the system activation module 31 sets an activation flag 44 to TRUE (or other value indicating to activate the speech system selection).

The speech processing module 32, for example, receives as input the activation flag 44. When the activation flag 44 is equal to TRUE (or other value indicating to activate the speech system selection), the speech processing module 44 sends a signal 46 to the recording device 20*b* to activate audio recording. In return, the speech processing module 32 receives the recorded speech data 48. The speech processing module 32 processes the recorded speech data 48 to determine a spoken command. The processing can be performed based on a set of recognized commands that identify speech enabled systems 16*a*-16*n* of the aircraft 12 and speech processing techniques known in the art. If the speech processing module 32 is unable to recognize a spoken command from the recorded speech data 48, optionally, the speech processing module 32 generates display data 50 that includes a message that, when displayed, indicates that the command was not recognized. If a spoken command was recognized, the speech processing module 32 determines a particular speech enabled system 16*a* of the speech enabled systems 16*a*-16*n* on the aircraft 12 and sets a selected speech system 52 to the particular speech enabled system.

The gaze processing module 34 receives as input the activation flag 44. When the activation flag 44 is equal to TRUE (or other value indicating to activate the speech system selection), the gaze processing module 34 sends a signal 54 to the recording device 20*n* to activate video recording. In return, the gaze processing module 34 receives recorded gaze data 56. The gaze processing module 34 processes the recorded gaze data 56 to determine a gaze direction. The processing can be performed based on gaze recognition techniques known in the art. If the gaze processing module 34 is unable to recognize a gaze diction from the recorded gaze data 56, optionally, the gaze processing module 34 generates display data 58 that includes a message that, when displayed, indicates that the gaze direction was not identified. If a gaze direction was recognized, the gaze processing module 34 determines a particular speech enabled system 16*a* of the speech enabled systems 16*a*-16*n* on the aircraft 12 and sets a selected speech enabled system 60 to the particular speech enabled system.

The gesture processing module 36 receives as input the activation flag 44. When the activation flag 44 is equal to TRUE (or other value indicating to activate the speech system selection), the gesture processing module 36 sends a signal 62 to the recording device 20*n* to activate video recording. In return, the gesture processing module 36 receives recorded gesture data 64. The gesture processing module 36 processes the recorded gesture data 64 to determine a gesture direction. The processing can be performed based on gesture recognition techniques known in the art. If the gesture processing module 36 is unable to recognize a gesture diction from the recorded gesture data 64, optionally, the gesture processing module 36 generates display data 66 that includes a message that, when displayed, indicates that the gesture direction was not identified. If a gesture direction was recognized, the gesture processing module 36 determines a particular speech enabled system 16*a* of the speech enabled systems 16*a*-16*n* on the aircraft 12 and sets a selected speech system 68 to the particular speech enabled system.

The speech system activation/deactivation module 38 receives as input the selected speech system 68 from the gesture processing module 36, the selected speech system 60 from the gaze processing module 34, and/or the selected speech system 52 from the speech processing module 32. The speech system activation/deactivation module 38 generates an activation/deactivation signal 70 based on the received selected speech system 52, 60, 68. The activation/deactivation signals 70 is received by the selected speech enabled system to activate and/or deactivate speech processing by the speech enabled systems, or alternatively, the activation/deactivation signals 70 are used to activate and/or deactivate speech processing by a centralized speech processor using a particular vocabulary and/or speech processing techniques.

When selected speech systems 52, 60, 68 are received from two or more of the gesture processing module 36, the gaze processing module 34, and the speech processing module 32, the speech system activation/deactivation module 38 determines the appropriate speech enabled system 16*a*-16*n* to generate the activation/deactivation signals based on an arbitration method. For example, if two or more of the selected speech systems 52, 60, 68 are the same, then the activation/deactivation signals 70 are generated based on the same selected speech systems. If, two or more of the selected speech systems 52, 60, 68 are different, then the selected speech system associated with a processing technique having a highest priority is selected. Alternatively, the speech system activation/deactivation module 38 may generate display data 72 that includes a message that indicates the different selected speech enabled systems 52, 60, 68 and a request to pick one of the different selected speech systems 52, 60, 68. In return, user input data 74 may be received indicating a selected one of the different selected speech systems 52, 60, 68, and the speech system activation/deactivation module 38 generates the activation/deactivation signals 70 based on the selected one.

Figure 3:
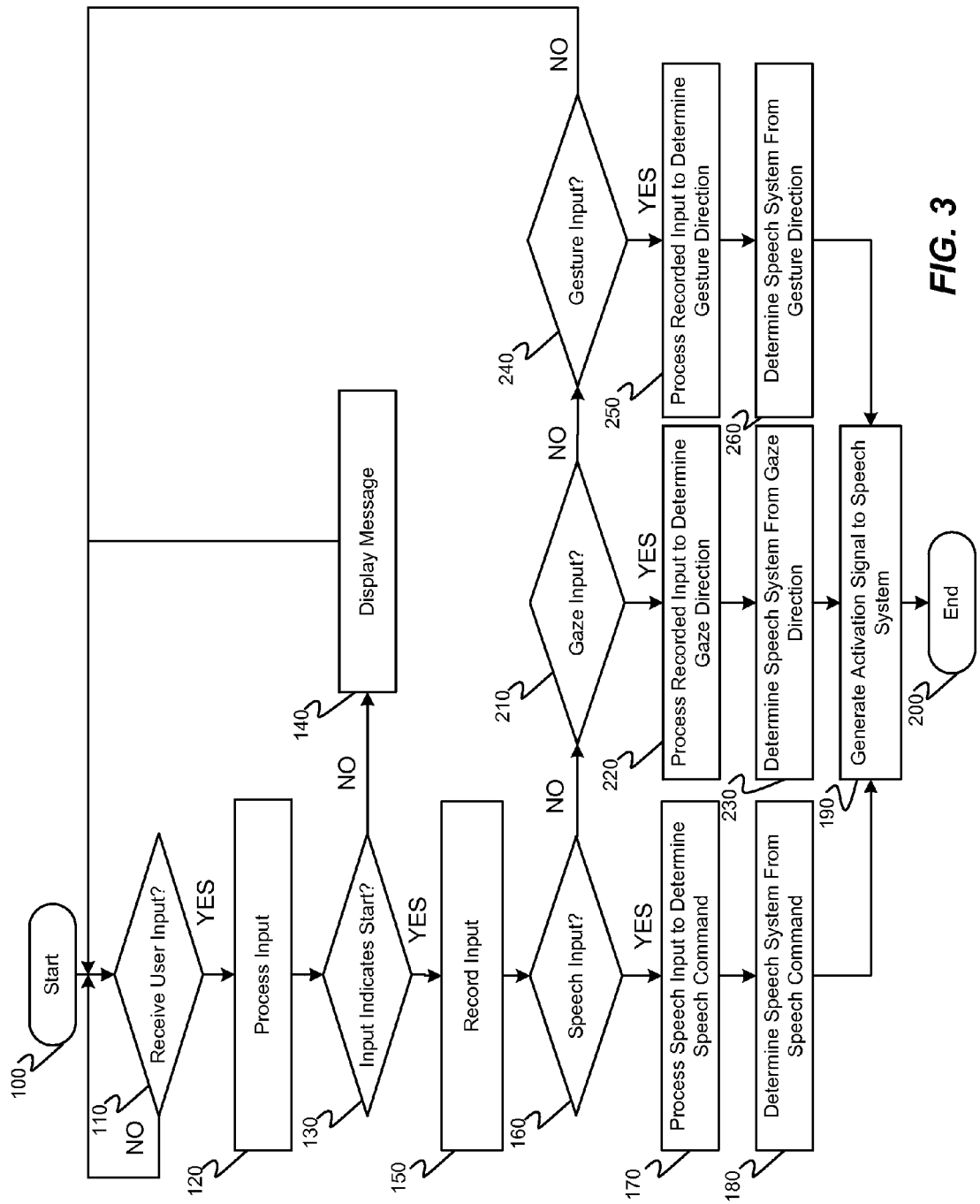
FIG. 3 is a flowchart illustrating a speech management method that may be performed by the speech management system in accordance with exemplary embodiments.

Referring now to FIG. 3 and with continued reference to FIGS. 1 and 2, a flowchart illustrates a method that may be performed by the speech management system 30 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure.

In various embodiments, the method can be scheduled to run based on predetermined events, and/or can run continually during operation of the computing device 14 of the aircraft 12.

The method may begin at 100. It is determined whether user input data 40 is received at 110. The user input data 40 may be received based on a user selecting an input device, such as, for example, the activation switch 20*a* or other device. If user input data 40 is not received at 110, the method continues with monitoring for user input data 40 at 110. If however, the user input data 40 is received at 110, the user input data 40 is processed at 120 and evaluated at 130. If the user input data 40 does not indicate to activate speech recognition at 130, optionally, a message may be displayed that indicates that the input is not recognized at 140 and the method continues with monitoring for user input data 40 at 110.

If, however, the user input data 40 does indicate to activate speech recognition at 130, the input device 16b, 16n is activated at 150 to start recording of the speech, the gesture, and/or the gaze of the user. If the recorded input is speech input at 160, the recorded speech data 48 is processed at 170 based on speech recognition methods to determine the speech command The selected speech system 52 is determined from the speech command at 180. The activation/deactivation signals 70 are generated and communicated to the appropriate speech system 16a-16n at 190 based on the selected speech system 52. Thereafter, the method may end at 200.

If, however, the recorded data is not speech data at 160 rather, the recorded data is gaze data 56 at 210, the recorded gaze data 56 is processed at 220 based on gaze recognition methods to determine the direction of gaze of the user. The selected speech system 60 is determined from the direction of gaze of the user at 230. The activation/deactivation signals 70 are generated and communicated to the appropriate speech system 16a-16n at 190 based on the selected speech system 60. Thereafter, the method may end at 200.

If, however, the recorded data is not speech data at 160, and the recorded data is not gesture data at 240, rather the recorded data is recorded gesture data 64 at 210, the recorded gesture data 64 is processed at 250 based on gesture recognition methods to determine the direction of the gesture of the user. The selected speech system 68 is determined from the direction of gesture of the user at 260. The activation/deactivation signals 70 are generated and communicated to the appropriate speech system 16a-16n at 190 based on the selected speech system 68. Thereafter, the method may end at 200.

The method shown in FIG. 3 illustrates processing one of speech data, gaze data, and gesture data to determine the selected speech system. As can be appreciated, two or more of the speech data, the gaze data, and the gesture data can be processed to determine the selected speech system. For example, if two or more inputs indicate the same speech system, then that speech system is the selected speech system. In another example, if one input indicates a first speech system and another input indicates a second speech system, then a message may be displayed indicating the discrepancy.

Those of skill in the art will appreciate that the various illustrative logical blocks, modules, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method performed by a computer processor for managing speech processing in an aircraft environment having at least two different speech enabled systems associated with the aircraft, comprising:

recording, by the computer processor, first user data that indicates an action of a user;

determining, by the computer processor, a selection of a vocabulary and a speech processing technique associated with a first speech enabled system of the at least two different speech enabled systems based on the recorded user data; and generating, by the computer processor, a signal to at least one of activate and deactivate speech processing for the speech enabled system based on the vocabulary and the speech processing technique associated with the first speech enabled system.

2. The method of claim 1, wherein the action of the user includes a gesture of the user.

3. The method of claim 1, wherein the action of the user includes a gaze of the user.

4. The method of claim 1, wherein the action of the user includes a spoken command from the user.

5. The method of claim 1, wherein the signal activates speech processing by the first speech enabled system.

6. The method of claim 1, wherein the signal activates speech processing by a centralized speech processor using the vocabulary and the speech processing technique associated with the first speech enabled system.

7. The method of claim 1, further comprising recording second user data that indicates a second action of the user, and wherein the determining the selection is based on the first recorded user data and the second recorded user data.

8. The method of claim 7, wherein the action of the user indicates at least one of a gesture of the user, a gaze of the user, and a spoken command from the user, and wherein the second action of the user indicates at least one of a gesture of the user, a gaze of the user, and a spoken command from the user.

9. The method of claim 1, further comprising receiving user input data indicating to activate recording, and wherein the recording is performed based on the user input data.

10. The method of claim 1, wherein the recording is performed continuously.

11. A system for managing speech in an aircraft environment having at least two different speech enabled systems associated with the aircraft, comprising:

an input device that records first user data that indicates an action of a user; and a computer processor that determines a selection of a vocabulary and a speech processing technique associated with a first speech enabled system of the at least two different speech enabled systems based on the recorded user data, and that generates a signal to at least one of activate and deactivate speech processing for the speech enabled system based on the vocabulary and the speech processing technique associated with the first speech enabled system.

12. The system of claim 11, wherein the action of the user includes a gesture of the user.

13. The system of claim 11, wherein the action of the user includes a gaze of the user.

14. The system of claim 11, wherein the action of the user includes a spoken command from the user.

15. The system of claim 11, wherein the signal activates speech processing by the speech enabled system.

16. The system of claim 11, wherein the signal activates speech processing by a centralized speech processor using the vocabulary and the speech processing technique associated with the speech enabled system.

17. The system of claim 11, further comprising a second input device that records second user data that indicates a second action of the user, and wherein the processor determines the selection based on the recorded user data and the recorded second user data.

18. The system of claim 17, wherein the action of the user indicates at least one of a gesture of the user, a gaze of the user, and a spoken command from the user, and wherein the second action of the user indicates at least one of a gesture of the user, a gaze of the user, and a spoken command from the user.

19. The system of claim 11, further comprising a third input device that generates user input data indicating to activate recording, and wherein the first input device records the user data based on the user input data.

20. The system of claim 11, wherein the input device records the user data continuously.

* * * * *